United States Patent
Leber et al.

(10) Patent No.: US 7,228,403 B2
(45) Date of Patent: Jun. 5, 2007

(54) METHOD FOR HANDLING 32 BIT RESULTS FOR AN OUT-OF-ORDER PROCESSOR WITH A 64 BIT ARCHITECTURE

(75) Inventors: Petra Leber, Weil der Stadt (DE); Jens Leenstra, Bondorf (DE); Wolfram Sauer, Nufringen (DE); Dieter Wendel, Schoenaich (DE)

(73) Assignee: International Business Machines Corporation, Armonk, NY (US)

(*) Notice: Subject to any disclaimer, the term of this patent is extended or adjusted under 35 U.S.C. 154(b) by 1054 days.

(21) Appl. No.: 09/683,351

(22) Filed: Dec. 18, 2001

(65) Prior Publication Data

US 2002/0129224 A1     Sep. 12, 2002

(30) Foreign Application Priority Data

Dec. 23, 2000  (EP) .................................. 00128490

(51) Int. Cl.
G06F 9/40 (2006.01)
G06F 9/44 (2006.01)

(52) U.S. Cl. .................. 712/227; 712/217; 712/210
(58) Field of Classification Search ............... 712/217, 712/219, 227, 218, 210
See application file for complete search history.

(56) References Cited

U.S. PATENT DOCUMENTS

| 5,574,928 | A | * | 11/1996 | White et al. ................... 712/23 |
| 5,752,062 | A | * | 5/1998 | Gover et al. ................... 714/37 |
| 5,805,916 | A | | 9/1998 | Mallick et al. |
| 6,094,719 | A | | 7/2000 | Panwar |

(Continued)

FOREIGN PATENT DOCUMENTS

WO    WO 01 37084 A    5/2001

OTHER PUBLICATIONS

Johnson, Mike. Superscalar Microprocessor Design. Prentice-Hall, Inc., 1991. Pages 133-134.*

(Continued)

*Primary Examiner*—Eddie Chan
*Assistant Examiner*—Jacob Petranek
(74) *Attorney, Agent, or Firm*—F. Chau & Associates LLC; Frank V. DeRosa

(57) ABSTRACT

A method for operating a processor having an architecture of a larger bitlength with a program comprising instructions compiled to produce instruction results of at least one smaller bitlength having the steps of detecting when in program order a first smaller bitlength instruction is to be dispatched which does not have a target register address as one of its sources, and adding a so_extract_instruction into an instruction stream before the smaller bitlength instruction. The extract instruction includes the steps of dispatching the extract instruction together with the following smaller bitlength instruction from an instruction queue into a Reservation Station, issuing the extract instruction to an Instruction Execution Unit (IEU) as soon as all source operand data is available and an IEU is available according to respective issue scheme, executing the extract instruction by an available IEU, setting an indication that the result of the instruction needs to be written into the result field of the instruction following the extract instruction, and writing the extract instruction result into the result field of the first instruction, and into all fields of operands being dependent of the first instruction.

10 Claims, 11 Drawing Sheets

U.S. PATENT DOCUMENTS 6,449,710 B1 * 9/2002 Isaman ................. 712/216
6,493,819 B1 * 12/2002 Mahurin et al. ............ 712/210

OTHER PUBLICATIONS

Hennessy, John and Patterson, David. Computer Organization and Design, 2nd ed. Morgan Kaufmann Publishers, Inc., 1998. Pages 118, 119, 175, 384 and B-9.*

Hennessy, John and Patterson, David. Computer Organization and Design, 2nd ed. Morgan Kaufmann Publishers, Inc., 1998. Back inside cover.*

Hennessy, John and Patterson, David. Computer Organization and Design, 2nd ed. Morgan Kaufmann Publishers, Inc., 1998. p. 185.*

* cited by examiner

METHOD FOR HANDLING 32 BIT RESULTS FOR AN OUT-OF-ORDER PROCESSOR WITH A 64 BIT ARCHITECTURE

BACKGROUND OF INVENTION

1. Field of the Invention

The present invention relates to an improvement of out-of-order CPU architecture regarding code flexibility. In particular, it relates to a method for operating an out-of-order processor having an architecture of a larger bitlength with a program comprising instructions compiled to produce instruction results of a smaller bitlength.

2. Description of the Prior Art

The present invention has a quite general scope which is not limited to a vendor-specific processor architecture because its key concepts are independent therefrom.

Despite of this fact it will be discussed with a specific prior art processor architecture.

FIG. 1 shows a schematically depicted prior art out-of-order processor 100, in this example a IBM S/390 processor having an essential component a so-called Instruction Window Buffer, further referred to herein as IWB. This is also depicted in FIG. 2 with reference numeral 110.

After coming from an instruction cache 160 and passed through a decode and branch prediction unit 170 the instructions are dispatched still in-order. In this out-of-order processor the instructions are allowed to be executed and the results written back into the IWB out-of-order.

In other words, after the instructions have been fetched by a fetch unit 170, stored in the instruction queue 140 and have been renamed in a renaming unit 115, see FIG. 2, they are stored in-order into a part of the IWB called reservation station (RS) 120. From the reservation station the instructions may be issued out-of-order to a plurality of instruction execution units 180 abbreviated herein as IEU, and the speculative results are stored in a temporary register buffer, called reorder buffer 125, abbreviated herein as (ROB). These speculative results are committed (or retired) in the actual program order thereby transforming the speculative result into the architectural state within a register file 130, a so-called Architected Register Array (ARA). In this way it is assured that the out-of-order processor with respect to its architectural state behaves like an in-order processor. The communication between rename unit reservation station 120, reorder buffer 125 and register file 130 is done with a multiplexer element 150.

In the before-mentioned prior art, exemplarily cited processor the central components of an out-of-order processor are implemented as a unified buffer, the above said Instruction Window Buffer (IWB).

Next, the Instruction Window Buffer components are described in some more detail and with reference to FIGS. 2 and 3 while introducing the problems of handling 32 bit instruction results in said exemplarily chosen 64 bit S/390 architecture.

From the instruction queue 140 up to 4 instructions are dispatched each cycle in program order to the IWB. The IWB pipeline is depicted in FIG. 3 and starts with renaming, 310, said up to 4 dispatched instructions. The renaming process, translates the source logical register address into a physical address specifying where the speculative result resides or will be stored after execution. Furthermore, it allocates new ROB entries for the storage of the speculative results after execution of the dispatched instructions.

The detection of a dependency of a source register with the target register of an instruction that resides in the IWB is done by the renaming logic by comparing the source operand register addresses with the target operand register addresses stored for each entry.

Next, match(0 . . . 63) signals generated for each entry are ANDed with a so called "current_bit(0 . . . 63)". A current_bit(i) is only ON when an instruction i is the youngest instruction in the IWB for the specific logical target register address. It should be noted that ANDing the match(0 . . . 63) with the current_bit(0 . . . 63) string—thereby generating the RSEL(0 . . . 63) string in FIG. 2—is needed, since several matches may be found for the same logical target address. However, only the match with the youngest instructions specifies the correct dependency. It should be noted further that instead of a current bit a priority filter logic could also be used to filter out the youngest match and thereby generating the RSEL(0 . . . 63) for an operand. The generation of the RSEL(0 . . . 63) string has been described here for a single operand, but it will be clear that in the case when more operands or more instructions are renamed, then for each operand such a RSEL(0 . . . 63) string is generated.

In the next "read ROB" cycle 320, the RSEL(0 . . . 63) selects the ReOrder Buffer (ROB). As a result the tag, data validity bit and target data (if available) will appear at the output ports of the ROB 125 for each source operand at the end of the second cycle. Dependent on the protocol that the IEUs supports, the tag, validity and data may not be read in the same cycle. In other words, after the read out of the tag, the read out of the data or the validity bits may be realized in separate cycles to maintain the consistency of the data between reorder buffer ROB 125 and reservation station 120. In case that there is no dependency (RSEL(0 . . . 63)="00 . . . 00") the "read_ARA" signal is switched ON by the ROB causing that the operand data will be read from the ARA 230 addressed by the logical address. This ends the "read ROB"cycle.

Next, in the "write RS" cycle 330 the tag, validity and data is written into the reservation 220 -entry allocated to the renamed instructions. Again, the writing of data in the reservation station may be delayed for the validity and data bits dependent on the protocol for tag and data of the IEU"s.

In the next cycle, the "select" cycle 340, the instructions for which the data was written into the reservation station in the previous cycle will be included into the set of instructions that are considered by the select logic for issue. In the IWB the select logic selects the oldest instruction that waits for issue for each IEU. This logic is implemented by a priority filter like it is described in the above referenced patent application. As a result of the select logic a string issue(0 . . . 63) is generated for the IEUs. A bit issue(i)="1" specifies that this entry in the RS 220 has to be issued to an IEU.

The generation of one or more issue(0 . . . 63) strings by the select logic ends the select cycle. It should be noted that the select logic may select the instruction for issue out of the normal program order for execution dependent on the availability of the source data for each instruction.

In the issue cycle 350, the issue(0 . . . 63) strings specify the RS entry that has to be read out, and at the end of the cycle the data, control, tag, etc. bits will appear at the RS ports to the IEUs.

Finally, then the execution of the instruction is done in the cycles "exe 1",360 and "exe 2" 370. The tags, specifying the entry where the data has to be stored in the ROB 125 and the RS 120, are compared with the stored tags for the sources. In case of a match the validity bit is set and the result data is stored in the sources of the dependent instruction in the RS.

Finally the commit process will free-up the IWB entries in the original program order by copying the data from the ROB to the ARA 130.

As soon as the data has been written into the ARA it has become the architectural state of the processor and the IWB entries can be used again to store the new instructions dispatched by the fetch unit.

SUMMARY OF INVENTION

A feature of the present invention includes a method for operating a processor having an architecture of a larger bitlength with a program comprising instructions compiled to produce instruction results of at least one smaller bitlength having the steps of detecting when in program order a first smaller bitlength instruction is to be dispatched which does not have a target register address as one of its sources, and adding a so_extract_instruction into an instruction stream before the smaller bitlength instruction. The extract instruction includes the steps of dispatching the extract instruction together with the following smaller bitlength instruction from an instruction queue into a Reservation Station, issuing the extract instruction to an Instruction Execution Unit (IEU) as soon as all source operand data is available and an IEU is available according to respective issue scheme, executing the extract instruction by an available IEU, setting an indication that the result of the instruction needs to be written into the result field of the instruction following the extract instruction, and writing the extract instruction result into the result field of the first instruction, and into all fields of operands being dependent of the first instruction.

It is thus an object of the present invention to operate an out-of-order processor having an architecture of a larger bitlength with a program comprising instructions compiled for an previous architecture having a smaller bitlength without the drawbacks of significant performance impact or otherwise without significant chip area increase as it was mentioned before.

These objects of the invention are achieved by the features stated in enclosed independent claims. Further advantageous arrangements and embodiments of the invention are set forth in the respective subclaims.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

The present invention is illustrated by way of example and is not limited by the shape of the figures of the accompanying drawings.

DETAILED DESCRIPTION

Figure 1:
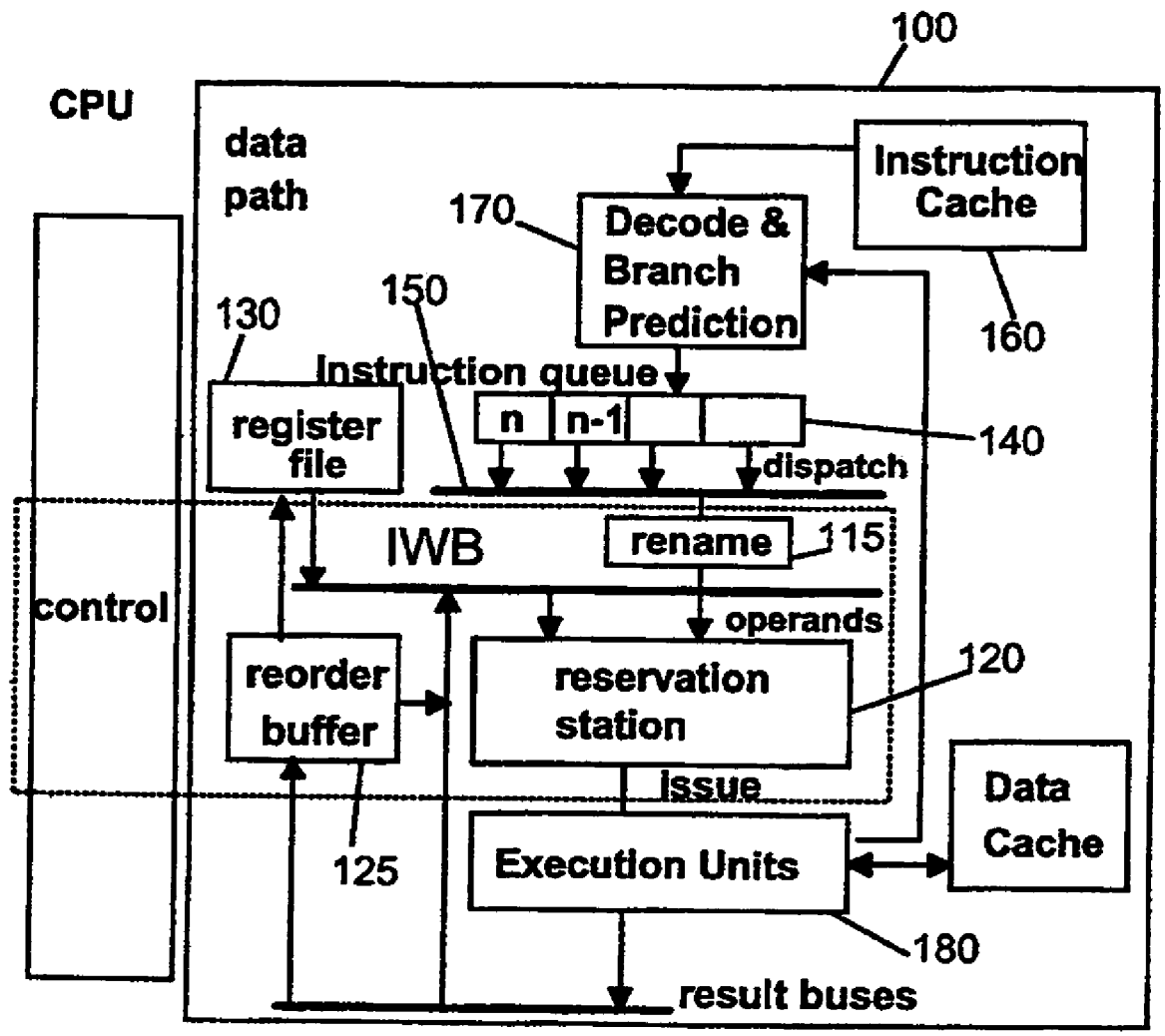
FIG. 1 is a schematic diagram showing the basic components of a prior art out-of-order processor.
Figure 2:
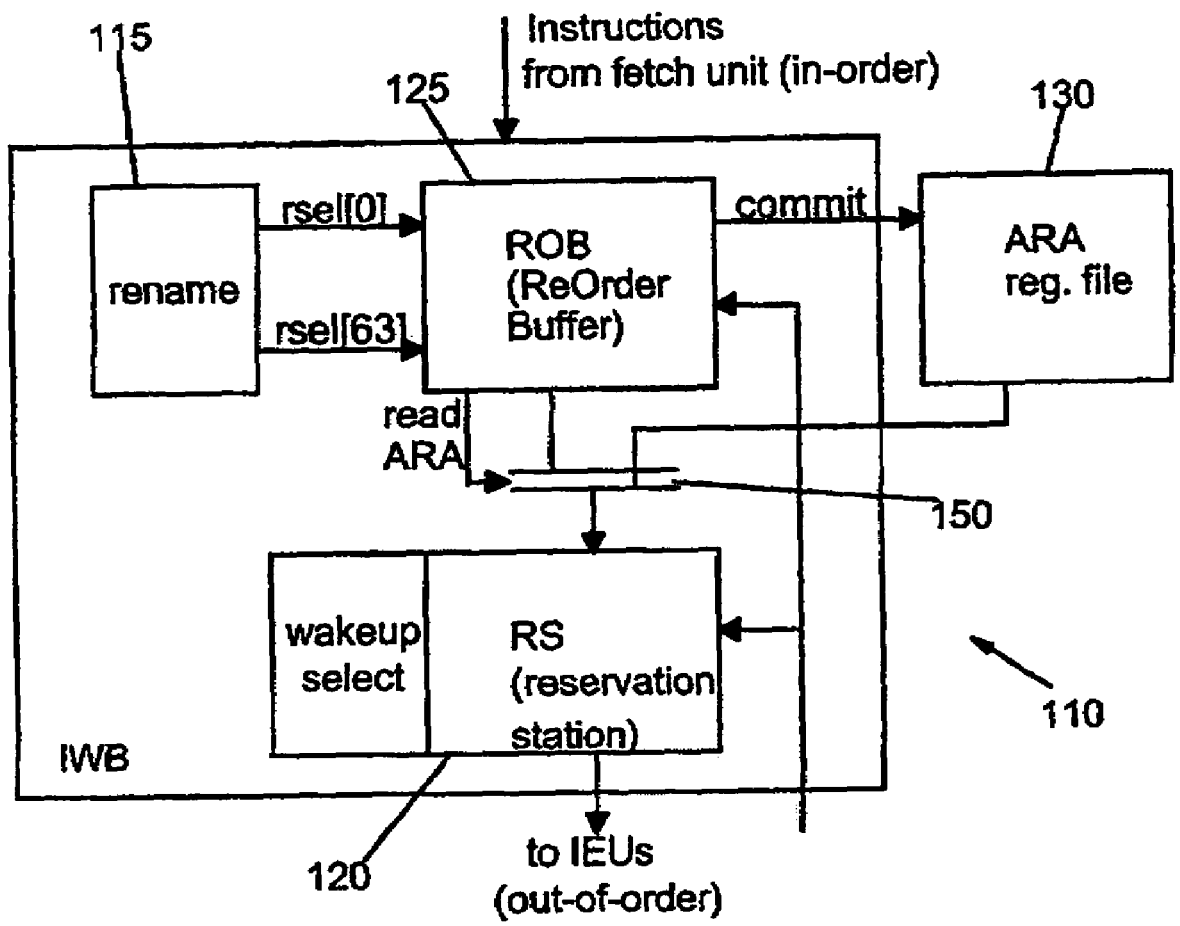
FIG. 2 is a schematic diagram showing the basic components of the central area, the Instruction Window Buffer (IWB) of the prior art out-of-order processor depicted in FIG. 1.
Figure 3:
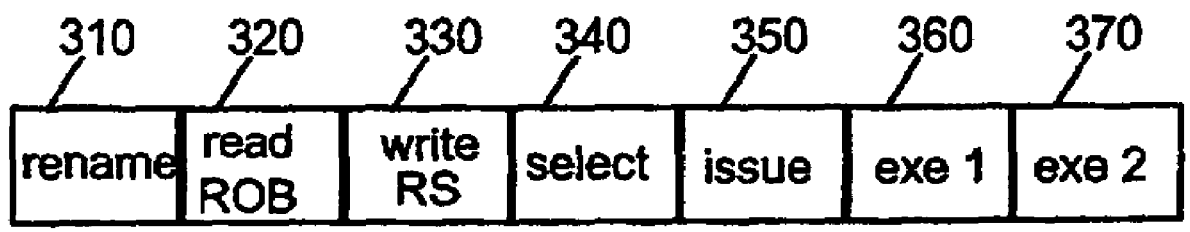
FIG. 3 is a schematic diagram showing the pipeline stages applied within the processor shown in FIG. 1.
Figure 4:
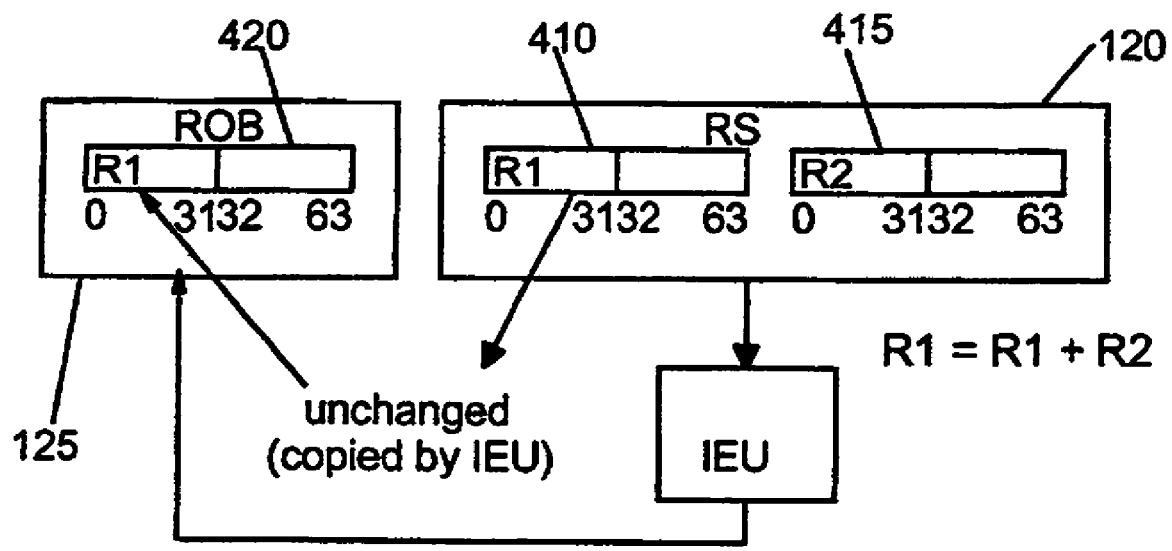
FIG. 4 is a schematic diagram showing the problem underlying the present invention.

The prior art processor cited above has a 32-bit architecture. It is, however desirable that a 64 bit architecture still supports former 32 bit instructions originating from the use of earlier developed programs. Thus, predetermined protocol convention exist in prior art that in case of writing a 32-bit result into a 64-bit register the "overhanging" bits have to remain unchanged. For most of the instructions this creates no particular problem, since for most instructions one of the source registers 410, 415 is the same as the target register 420. Hence, the unchanged 32-bits of the result 0 . . . 31 is available as input to the execution unit and it can be used to set the 32 bit part of the 64 bit result that does not have to be calculated.

A problem now occurs in a 64-bit architecture for those instructions that do not have the result register as their respective input. These instructions for example include a performance critical instruction like "Load Address". For the exemplary Load Address instruction "LA R1, D2(X2, B2)" the address specified by the X2, B2 and D2 fields is placed in the general register R1. Thereby, the address is a 32-bit result and the bits 0–31 of R1 have to remain unchanged. In an in-order processor, the implementation of the leaving bits 0–31 to be unchanged could be accomplished by only writing bits 32–63 in the register R1.

In an out-of-order processor, however, the IWB can contain many instructions at a time with their speculative results being calculated. Since the LA instruction may be followed by a 64 bit instruction that has as a source R1 dependent on the LA instruction result, all 64 bits need to be available in the Reservation station.

Figure 5:
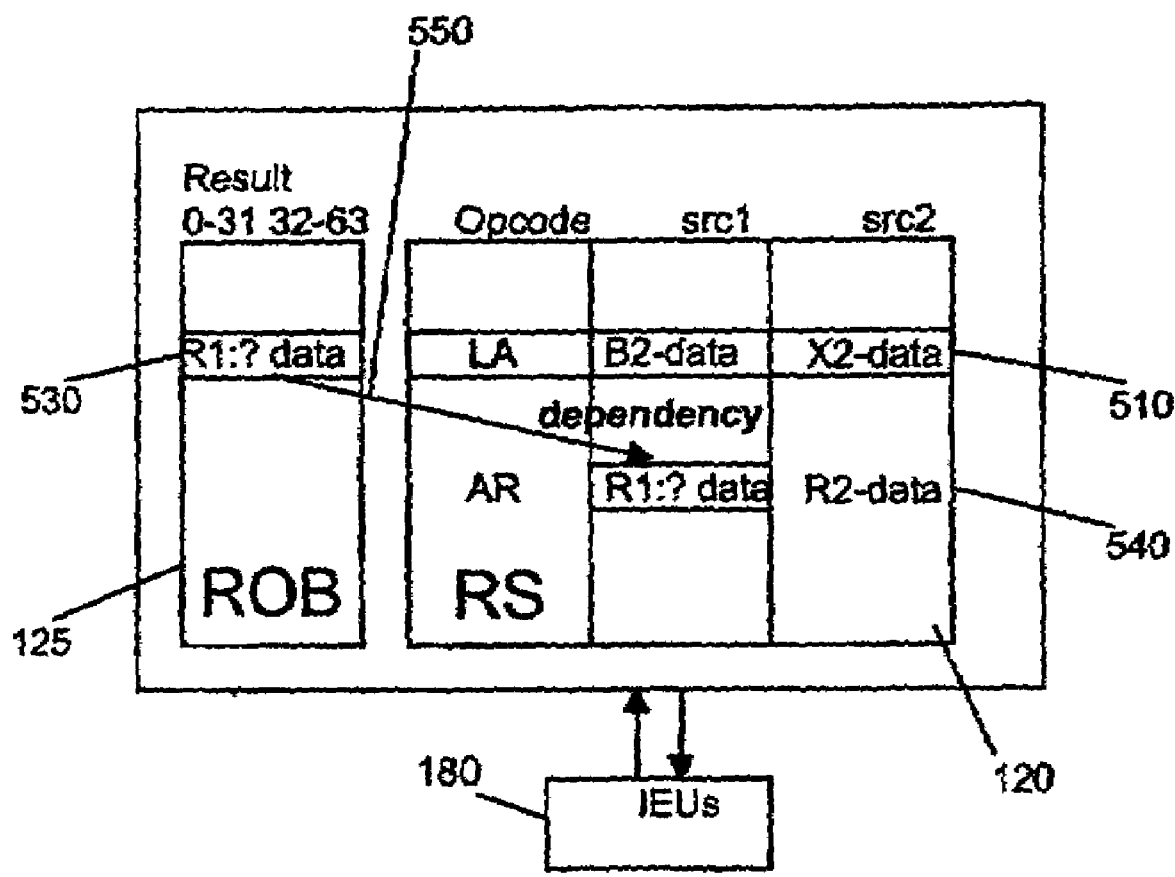
FIG. 5 is a schematic scheme showing the 64-bit instruction source dependency on a LA instruction with a 32-bit result.

This problem is next illustrated in some more detail with reference to FIG. 5 as an example.

After the LA instruction—which is symbolically depicted with the horizontal RS entry 510—is issued from the Reservation station 120 to the IEU 180 the result for bits 32–63 is calculated by the IEU and next written into the ROB entry 530 of the LA instruction as well as into all dependent sources in the reservation station 120. For example, here the 64 bit AddRegister (AR) instruction 540 is dependent on the result of the 32 bit LA instruction which is illustrated by the arrow 550. But since the LA instruction only writes bits 32–63 the other bits 0–31 remain undefined. Therefore the problem arises how in the given example the R1 source operand data(0–31) of the 64 bit AR instruction becomes available for execution of the AR instruction. All 64 bits of data for R1 are needed before the 64-bit AR instruction can be executed by the IEU.

The problem could be solved without special additional hardware by the introduction of a merge instruction. This solution is illustrated in FIG. 6 for the example given in FIG. 5.

Figure 6:
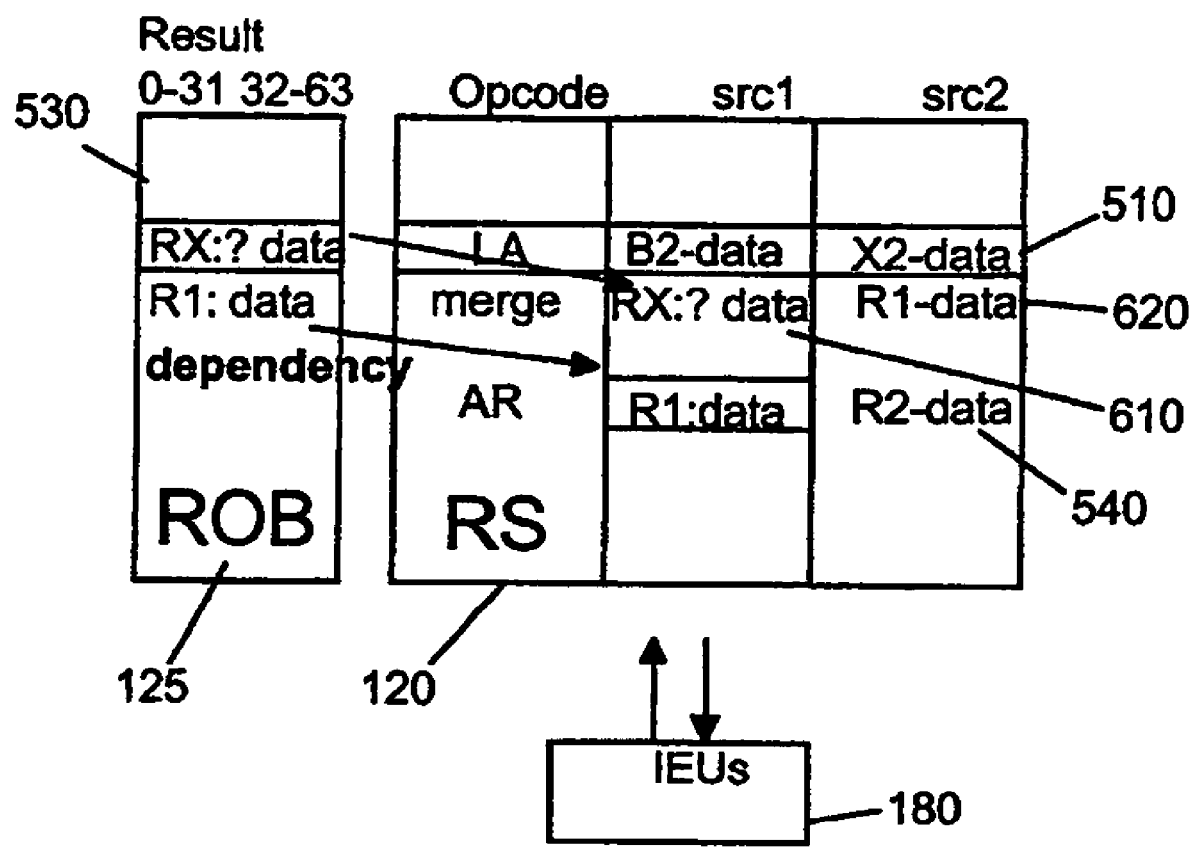
FIG. 6 is a schematic scheme showing an additional merge instruction for resolving the case depicted in FIG. 5.

With reference to FIG. 6 the problem is solved by first writing the 32-bit result of the LA execution into the temporary register 610, here called RX. The merge instruction 620 has this register as its source input together with the R1-data in which the result of the LA register has to be written. After the execution of the LA instruction, the merge instruction will be issued next and the IEU will merge the bits 0–31 of the R1-data, i.e., the unchanged bits and the bits 32–63 of the RX-data into the 64 bit result for the R1 register. Since the AR instruction 540 still has a dependency on the R1 register it now will receive the required full 64-bit result of the merge instruction as its source operand.

The drawback of the solution is that due to the execution of the merge instruction at least one extra cycle is added before the R1 data is available. This is a significant performance impact since the LA instruction is heavily used. In many cases this is not tolerable, on others it might.

Another solution would be to have two almost separate IWBs each handling 32 bit.

Figure 7:
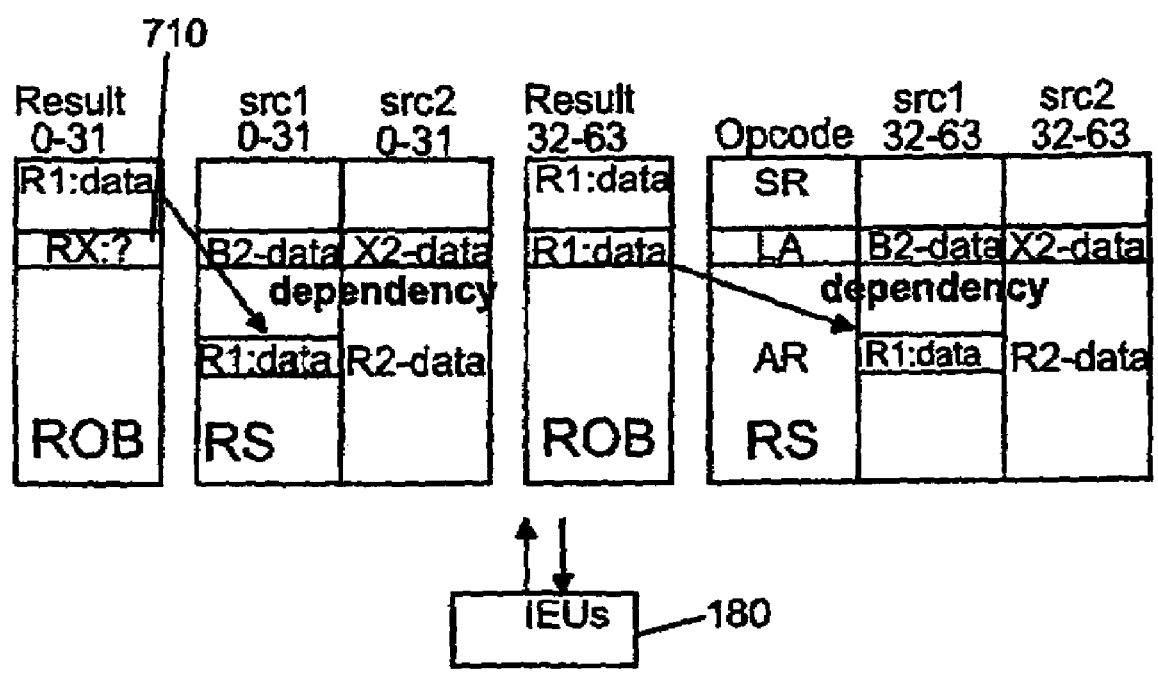
FIG. 7 is a schematic scheme showing a "double IWB" for resolving the case depicted in FIG. 5.

A lot of control logic needs to be duplicated. This solution is illustrated with reference to FIG. 7 and described next below.

Since renaming unit, RS and ROB are now each implemented on a 32 bit basis it is now possible to specify that the LA instruction will only update the lower 32-bit part in the ROB. This is accomplished by specifying that the bits 0 . . . 31 have to be written into a temporary register 710, here called RX, while bits 32–63 are specified to be written into R1. When the dependency search for the AR instruction depicted below said LA instruction is performed, then the dependencies found for the R1 register will be different for the bits 0–31 and for the bits 32–63. For bits 0–31 the dependency search will find no match between the R1 register of AR and the RX register of LA. Therefore it will load the data from the register file or set the dependency to an instruction in the IWB that calculates bit 0–31 of the full 64-bit result for R1. So in FIG. 7, the bits 0–31 of the AR instruction have a dependency on the exemplarily chosen Subtract (SR) instruction. The result bits 0–31 of the SR instruction will therefore be written into the R1 source field bit 0–31 of the AR instruction. The drawback is a significant area increase and power consumption costs for this splitted IWB solution. Renaming logic, compare logic for ROB as well as the RS are now all needed twice. Therefore, this solution is rather unattractive from a point of hardware costs.

The present invention discloses a method and a respective exemplary implementation scheme to handle instructions in an out-of-order processor that write a 32-bit result into a 64-bit wide register. The 64-bit architecture specifies that the 64-bit result has to be constructed from the 32-bit result by leaving the remaining, i.e., overhanging 32 bits unchanged. To handle the setting of the 32 bits that have to be unchanged a so-called extract instruction is disclosed which writes the "overhanging" bit portion not into its own result field but in the result field of the subsequent—here a LA—instruction.

According to its primary aspect an inventional method for operating a processor having an architecture of a larger bitlength with a program comprising instructions compiled to produce instruction results of a smaller bitlength is disclosed which comprises the following essential steps: The main advantage is that the extract instruction can be executed independently of the following LA—or other—instruction whereby the above mentioned problems are solved nearly without performance loss or increase of chip area of a respective implementation of reservation station and reorder buffer.

Advantageously, the step of writing the extract instruction result into the result field of said first instruction is controlled by incrementing a tag specifying in which location the result of the first instruction has to be written.

The inventional method can be applied to cases in which the larger bitlength is 64-bit and the smaller bitlength is 32-bit, or in which the larger bitlength is 128-bit and the smaller bitlength is 64 or 32-bit, even when code combinations of more than one smaller bitlength is present.

Further, the inventional method can be varied and/or improved by selectively inserting an extract instruction according to the above concept, only when said second instruction is dependent of the first instruction. This means, in particular, checking if the second instruction uses the target register of the first instruction as a source register, and if it is used then inserting said extract instruction into the instruction scheme. This can be advantageously applied when these occurrences can be appreciated to be quite rare, in advance.

The method according to its primary aspect can be extended to further comprising the steps of dispatching said LA instruction in the same cycle as the extract instruction. Then, in the same cycle both of said two instructions write the results into the RS, causing a multiple write into the same result register.

Multiple writes into the same register are handled by ORing or ANDing respectively as described in more detail later on.

By these further steps a latch can be written without unpredictable results although it is selected double—or multiple—by a respective plurality of input lines.

Advantageously, the above procedure can be performed either whenever a 32 bit result is written into a 64-bit register, -or this can be selectively performed only when said result register is used for a subsequent 64-bit instruction as a source register, i.e., in case of the above mentioned write after read or write after write dependency problems.

Further, when associating the same instruction execution unit to said first and said second instruction a multiple write into the same result register is prevented which could otherwise be caused by a concurrently performed execution of said first and said second instruction.

Figure 8:
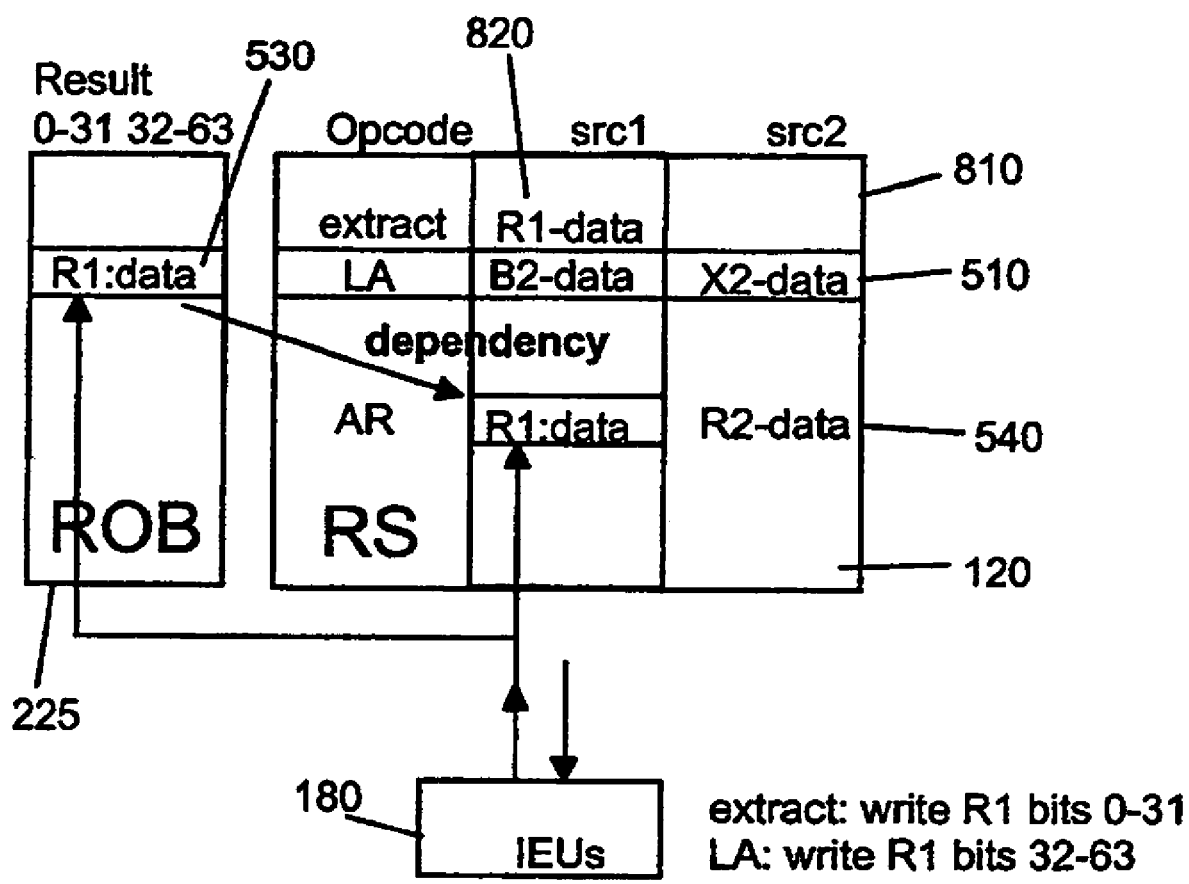
FIG. 8 is a schematic inventional scheme showing an additional extract instruction for resolving the case depicted in FIG. 5.

With general reference to the figures and with special reference now to FIG. 8 the structural elements of the inventional processor design according to a preferred embodiment thereof is described in more detail. The general aspect of this scheme is independent of a particular processor chip realization.

In FIG. 8, an inventional extract instruction 810 has been added in front of the LA instruction 510. Comparisons to prior art should only made now to FIG. 5.

The operation of the extract instruction given in FIG. 8 is as follows:

The extract instruction 810 has the result register 530 of the LA instruction as its source operand 820. This enables the IEU 180 to route the R1 data bit 0–31 to its output. The other bits 32–63 will be set to "00 . . . 00" assuming ORing (or alternatively "11 . . . 11", if ANDing) within the cell, by the IEU during the execution of the extract instruction. Furthermore, the IEU 180 sets a control bit indicating that only the "overhanging" bits 0–31 of the result needs to be written into the ROB 225 and into the other dependent operands of the RS 220. Finally, the IEU increments the tag in a wrap-around fashion specifying into which location of the ROB the result has to be written.

As a result, the extract instruction writes the result into the result field of the LA instruction 510 as well as in all reservation station fields of dependent operands. It should be noted that the RS fields of dependent operands are written by comparing tags. Therefore, the result is correctly written into the ROB 225 and the RS 120 when the tag is incremented.

Instead of doing the increment of the tag by the IEU, as an alternative it can already be incremented by the decoder in the Fetch Unit.

The advantage of using the extract instruction instead of for example the merge solution shown in FIG. 6 is that the extract can be executed independent of the LA instruction. Since, the extract instruction writes the bits that have to remain unchanged, these bits are usually available even before the LA instruction starts execution. Simulations modeling the performance degradation of this solution (<1%), showed a very minor performance impact for this solution.

Some extensions of the prior art IWB that are needed to implement the extract solution successfully include the following:

1. Valid Bit for Bits 0–31 and Bits 32–63 of the RS and ROB Data Fields

Now that the extract instruction writes the 0–31 bit part of the result independently of the extract instruction writing the bits 32–63, a separate valid bit for bits 0–31 and for bits 32–63 is needed. Also, the instruction may only be issued when all valid bits of the sources are ON. Furthermore, the result may only be committed when all result data valid bits are ON.

2. Grouped Dispatch of the Extract and LA (or Similar) Instruction

It must be assured that the LA instruction is written into the RS when the extract instruction is executed. Therefore, the fetch unit will take care that both instructions are dispatched in the same cycle and both, or none of them are written into the RS.

There are three different sequences in which the extract and the LA instruction, both requiring the same number of cycles for execution by the IEU, can be executed:

1. The Extract Instruction is Issued Before the LA Instruction to an IEU

In this case the bits 0–31 are written by the extract instruction and the associated valid bit for the partial written data is set ON. After LA issue/execution, the bits 32–63 are written and the associated valid bit for the bits 32–63 is set ON. Both valid bits being now ON, indicate that the 64-bit data field is now valid.

2. The Extract Instruction is Issued After LA Instruction to an IEU

This case is basically similar to the previous case, but now the bits 32–63 are written first by the LA instruction, and thereafter bits 0–31 are written by the extract instruction.

As discussed before, this case is the rather unusual for programs running on a processor.

3. The Extract and the LA are Issued in the Same Cycle to an IEU

Since more than one IEU are attached to the reservation station it is possible too that both instructions are issued in the same cycle but to different IEUs. Since both instruction take the same number of cycles to execute also the result will be returned in the same cycle. Now the situation occurs that the bits 0–31 and bits 32–63 are both written at the same time by different IEUs. This however has complications for the logic controlling the write of the 64-bit data fields. This will be explained further with the help of FIG. 9.

Figure 9:
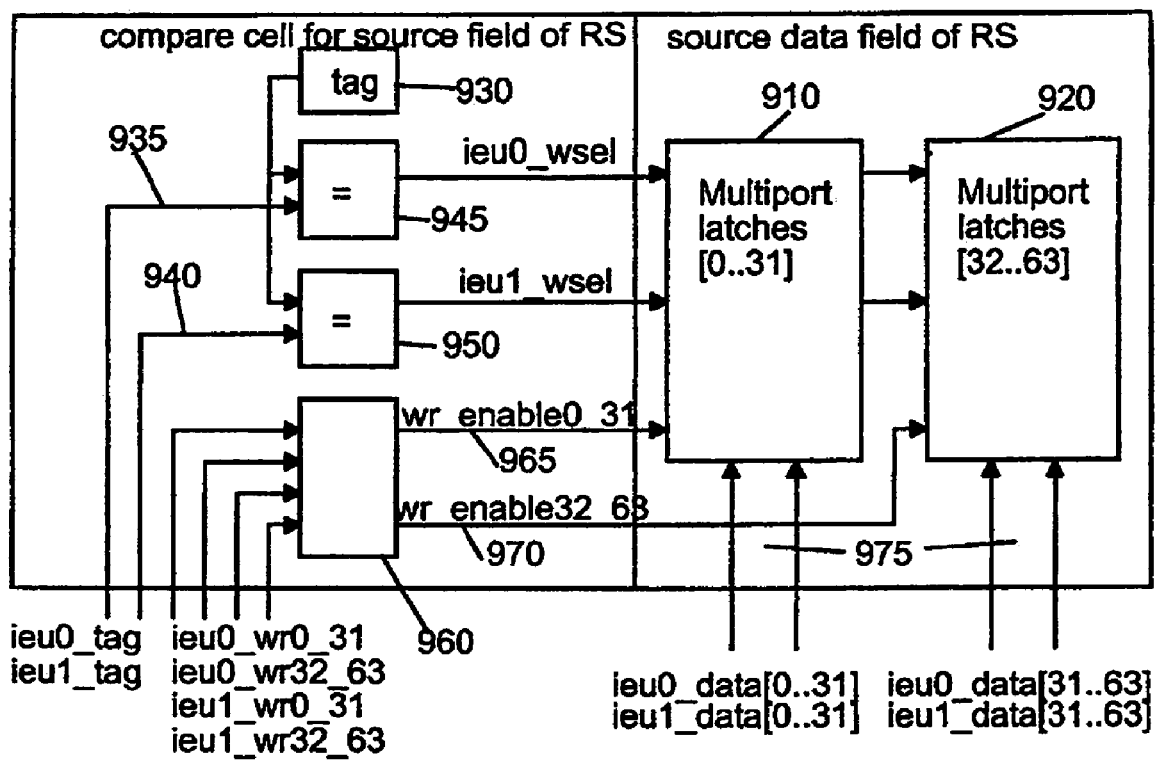
FIG. 9 is a schematic implementation scheme for the inventional extract instruction showing a compare logic and latches for reservation station source data field.

With reference now to FIG. 9 a specific implementation is given for a compare logic and latches for a RS source data field in order to cover the case 3., above, in which the extract instruction and the LA instruction are issued in the same cycle to an IEU.

FIG. 9 shows the latches 910, 920 of a 64-bit data field together with the logic—left part of the figure—that controls the writing into the latches.

In the Reservation Station (RS) a tag 930 is stored for each source operand for which a dependency was found by the renaming logic. This tag is compared each cycle with the ieu0_tag via line 935 and ieu1_tag via line 940. A match tag in the respective comparators 945 and 950 means that the IEU result has to be written into the latches 910, and 920, respectively. This IEUO write is activated by setting the compare result signal ieu0_wsel to ON. Similarly, the IEU1 result write is activated by setting ieu1_wsel to ON. Furthermore, the control signals ieu(0 . . . 1)_wr0_31 and ieu(0 . . . 1)_wr_32_63, being input into a decode logic 960 specify if the result has to be written into latches(0 . . . 31) and/or latches(32 . . . 63) via the control signals wr_enable0_31, denoted as 965, and wr_enable32_63, denoted as 970, respectively.

For example, if a 64-bit result is returned by ieu0, then ieu0_wr0_31 and ieu0_wr32_63 will be both ON. For this input combination the decode logic sets the signals write_enable0_31 and write_enable32_63 both to ON. This activates the write of data for all 64 bits. Next, with ieu0_wsel being ON, the data on the bus 975 ieu0_data (0 . . . 63) will be written into the latches(0 . . . 63).

If a 32-bit result for 0–31 has to be written, for example by IEUO, then ieu0_wr0_31 will be set ON by IEUO and ieu0_wr32_63 will be OFF. As a result of the decode logic, the write_enable0_31 is set ON and write_enable32_64 is set OFF. Since the write for bit 32–63 is not enabled, only the data on bus ieu0_data(0 . . . 31) will be written into the latches(0 . . . 31) when ieu0_wsel is ON. The content of latches(32 . . . 63) remains unchanged. So, for the cases 1 and 2 discussed above this implementation behaves correctly since ieu0_wsel or ieu1_wsel is ON and ieu0_wsel and ieu1_wsel are never both ON in the same cycle for a data field.

If, however, both, the extract and the LA instruction write their results into the same data field, then ieu0_tag equals ieu1_tag and ieu0_wsel and ieu1_wsel will be set ON since both tags match with the tag stored for the data field. Furthermore, wr_enable0_31 and wr_enable32_63 will be set ON by the decode logic 960 since the write has to be enabled for latch(0 . . . 31) as well as for latch(32 . . . 63). As a result, it is tried to write the ieu0_data and ieu1_data into the same latches(0 . . . 63).

This problem can be resolved by providing for a separate tag compare logic for bits 0 . . . 31 and for bits 32 . . . 63. This, however, is very costly since the compare logic consumes a significant amount of area and power.

Another solution would be to double the ieu.._wsel lines into a separate ieu.._wsel0_31 and into a ieu.._wsel32 . . . 63. For a plurality of two IEUs, IEU0 and IEU1, this solution is acceptable since due to the doubling of the wsel signal the two wr_enable_ . . . Signals are no longer needed. However, when the number of IEUs that write into the queue becomes larger (for the IWB up to 8), then the doubling of the wsel signals from for example 8 to 16 (−2 enable) is no longer acceptable and a large amount of extra area is required.

Figure 10:
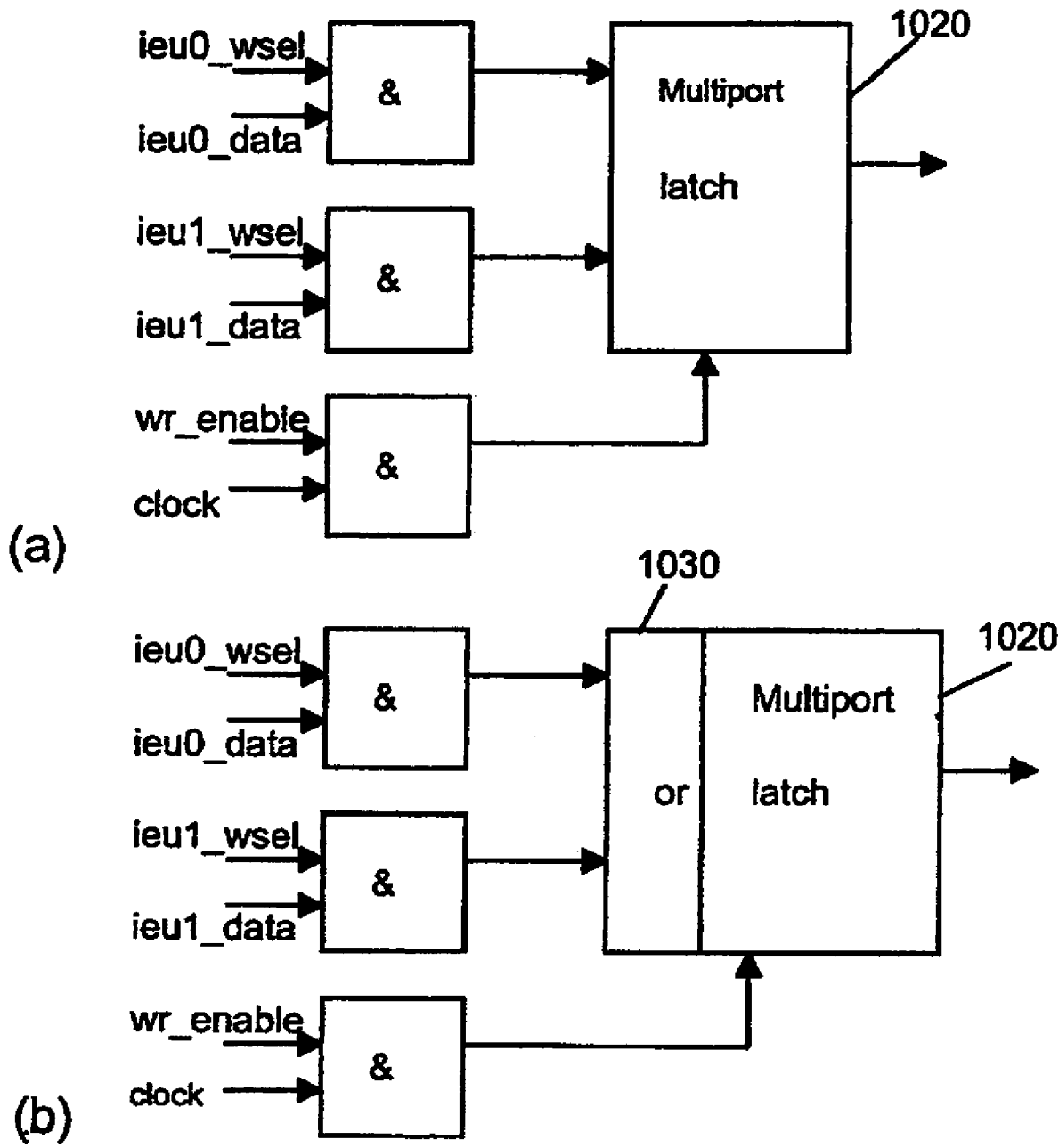
FIG. 10 is a schematic scheme according to FIG. 9 showing the problem of multiple write into the latch (a) and the solution with an integrated OR gate at the input thereof.

The present invention solves this problem for the IWB implementation as follows:

The IEU, when generating a 32 bit result, will set the other unrelevant bits to all "000 . . . 00". Furthermore, the latch behavior is modified such that it supports a defined state in the case of multiple writes. This multiple write feature is described next and is illustrated in FIG. 10.

If a multiple write in the same latch is executed by only a single ieu.._wsel signal being ON at the same time for a cell, it needs not to be specified what the latch behavior will be for the case that two wsel signals are ON, see FIG. 10a, upper part.

As, however, the ieu0_wsel and ieu1_wsel signals can be both ON, the required latch behavior is as shown in FIG. 10b. The latch 1020 will OR the result in an OR gate 1030 on its inputs.

Hence, when the unrelevant bits are all set to "00 . . . 00" for the other port, then the correct data will be written into the cell. For example, in the case that IEU0 returns the result of a LA with ieu0_data(0 . . . 31)="000 . . . 000", ieu0_data (32 . . . 63)="101 . . . 111" and IEU1 returns the result of the extract instruction with ieu1_data(0 . . . 31)="111 . . . 001" and ieu1_data(32 . . . 63)="000 . . . 000" then the data (0 . . . 63)="111 . . . 001 101 . . . 111" will be written into the latches.

With additional reference now to FIG. 11 the control flow of the method according to the before-described embodiment will be summarized next below:

When a program having a combined 32-bit and 64-bit code is run on a computer equipped with the inventional processing scheme therein, in a step 1110 a decision is taken if a 64-bit operating mode is prevailing or not. If not, the prior art way to operate a 32-bit Program may be followed.

In the YES branch of decision 1110 the next decision is directed to determine if a 32-bit instruction, not setting the remaining 32 bit of the 64-bit register field to the unchanged value.

In the NO-branch of decision 1120 no such 32 bit instruction is detected. Then it is branched back to step 1120 in order to perform the analysis for the next instruction in the stream.

In the YES-branch of decision 1120, however, the inventional EXTRACT instruction is added into the instruction stream before the 32-bit instruction, step 1130.

Then, step 1140, the EXTRACT instruction and the 32-bit instruction are both dispatched concurrently.

Then, it is checked if all source operands are available for the 32-bit instruction what yields a decision 1150.

In its NO-branch the process control waits, step 1155 and monitors the valid bits indicating said availability.

In the YES branch thereof it is checked if an instruction execution unit 180 is free, i.e. is available what yields in turn a decision 1160.

In the NO-branch it is waited until an IEU is free, step 1165. Then, in the YES branch thereof the EXTRACT instruction is issued to a free IEU, step 1170 and it is executed by that in a step 1180.

Then, in a step 1190 the before-described tag incrementation takes place in order to locate the register the result is written back to, step 1190.

Then, in a step 1195 the EXTRACT result is written back to the result register of the 64-bit instruction and into all dependent source registers. Thus the EXTRACT instruction work is done the whole 64-bit range can now be used for the instruction(s) to follow—for both, a 64-bit as well as for a 32-bit instruction possibly more downstream the instruction stream.

In addition, the control flow scheme depicted in FIG. 11 can be modified in order to reflect a "selective adding" of the extract instruction only when really required—after detection of a combined bit length code, and after detection of the dependency situation described above with reference to FIG. 11. For this modification the same figure is referenced again.

In the YES branch of decision 1110 the next decision is directed to determine if a 32-bit instruction not setting the not calculated 32 bit to the unchanged value—in other words the target address register is not one of the source register address for the instruction—is followed by a 64-bit instruction which is dependent of the 32-bit one.

In the NO-branch of the thus modified question and decision 1120 no dependency is detected. Then it is branched back to step 1120 in order to perform the dependency analysis for the next instruction in the stream.

In the YES-branch of said modified question/decision 1120, however, first all the instructions starting from the 32 bit instruction—with the not calculated 32 bit not set to unchanged—on which a source of the 64-bit instruction is dependent on are removed from the RS and ROB queues.

Next, the instruction stream is re-fetched starting at the 32 bit instruction, and the inventional EXTRACT instruction is added into the instruction stream before the 32-bit instruction, step 1130. The advantage of this method is that the extract instruction is only added when the problem occurs. The disadvantage is that instructions are removed from the queue and re-fetched again. So, this method is advantageous when an extract instruction has to be added rather seldom.

Figure 11:
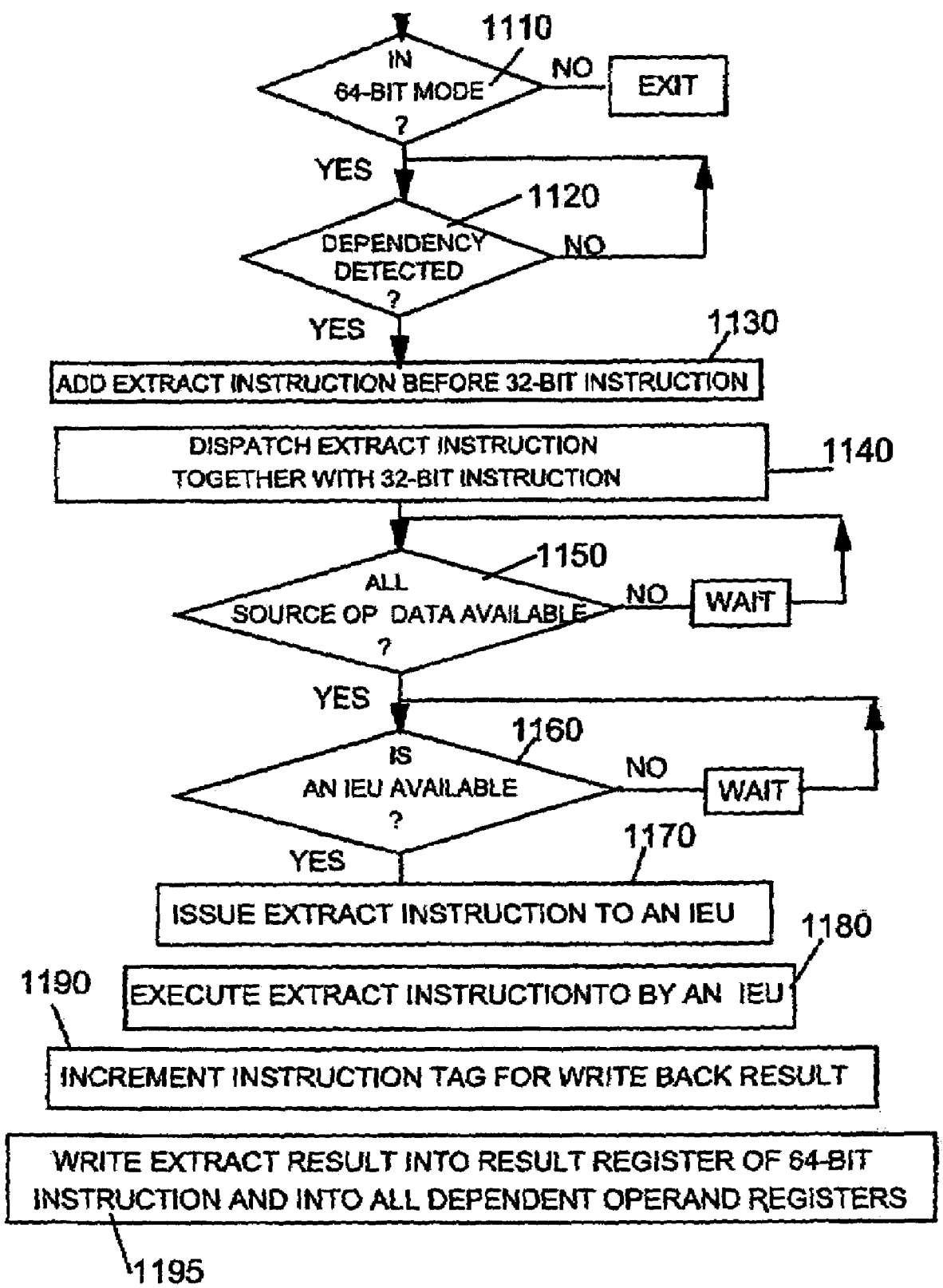
FIG. 11 is a schematic diagram showing the control flow and some basic steps of the method according to a preferred embodiment thereof.

Next, the same steps follow as has been described for FIG. 11.

In the foregoing description the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, the unrelevant bits could have been set to all "11 . . . 11" by modifying the behavior of the latch with AND gates instead of OR gates as depicted above in case of multiple write.

Further, the present invention disclosed in here applies a LA instruction as an example, only. However, it will be appreciated by a person skilled in the art that each other instruction returning a 32 bit result into a 64 bit data field for which the bits not written have to remain unchanged can be implemented according to the present invention. Furthermore, the number of IEUs was in the example limited to two in order to improve clarity. But also a larger number of IEUs may be connected to the RS.

In this disclosure, the invention was described for the IWB that includes the storage of data into the reservation station queue. In other pipeline schemes the result and source data is stored in a separate register File and the source data is read from this file after RS issue. The solution presented here is also applicable for such a type of pipeline. The execution of the extract instruction will then result in writing the unchanged bits into the location of the register file assigned to the LA instruction instead of into the RS and ROB.

Further variations are possible in that the extract instruction is selectively inserted into the instruction stream only when required. In that case, the IWB signals the IFU to re-dispatch the instruction with an extract instruction in case that it is detected that the source of a 64 bit instruction depends on a LA or other instruction which does not set the "unchanged overhanging bits".

The invention claimed is:

1. A method for operating a processor having an architecture of a larger bit-length with a program comprising instructions compiled to produce instruction results of at least one smaller bit-length, characterized by the steps of:
   detecting when in program order a first instruction is to be dispatched which does not have a target register address as one of its sources, wherein the first instruction is one of the instructions compiled to produce instruction results of at least one smaller bit-length;
   adding an extract instruction into an instruction stream before the first instruction, the extract instruction comprising the following steps of:
   a. dispatching the extract instruction together with the following first instruction from an instruction queue into a Reservation Station;
   b. issuing the extract instruction to an Instructional Execution Unit (IEU) as soon as all source operand data is available and an IEU is available according to respective issue scheme;
   c. executing the extract instruction by an available IEU;
   d. setting an indication that the result of said extract instruction needs to be written into a result field of the first instruction following the extract instruction, and;
   e. writing the extract instruction result into the result field of said first instruction, and into all fields of operands being dependent of said first instruction.

2. The method according to claim 1 in which the step of writing the extract instruction result into the result field of said first instruction, is controlled by incrementing a tag specifying in which location the result of the first instruction has to be written.

3. The method according to claim 1, further comprising the steps of having the larger bit-length equal to 64-bit and the smaller bit-length equal to 32-bit.

4. The method according to claim 1, further comprising the steps of having the larger bit-length equal to 128-bit and the smaller bit-length equal to 64 or 32-bit.

5. The method according to claim 1, further comprising the step of when a second instruction is dependent of the first instruction, selectively inserting an extract instruction.

6. The method according to claim 1, further comprising the steps of dispatching said first instruction in the same cycle as the extract instruction, and assuring that in the same cycle both or none of said two instructions is written into a reservation station means, and in case of a multiple write into the same result latch reducing the respective multiple input signals for the latch by either one of an OR gate or an AND gate, respectively.

7. The method according to claim 1, further comprising the step of associating the same instruction execution unit for said first and said extract instruction.

8. A computer system having an out-of-order processing system for operating a processor having an architecture of a larger bit-length with a program comprising instructions compiled to produce instruction results of at least one smaller bit-length, said computer system uses a computer readable machine language, said computer readable machine language comprises:
   a first computer readable code for detecting when in program order a first instruction is to be dispatched which does not have a target register address as one of its sources, wherein the first instruction is one of the instructions compiled to produce instruction results of at least one smaller bit-length;
   a second computer readable code for adding an extract instruction into an instruction stream before the first instruction, said extract instruction comprising additional computer readable code, said additional computer readable code comprises:
      a third computer readable code for dispatching the extract instruction together with the following first instruction from the instruction queue into a Reservation Station,
      a fourth computer readable code for issuing the extract instruction to an Instruction Execution Unit (IEU) as soon as all source operand data is available and an IEU is available according to respective issue scheme,
      a fifth computer readable code for executing the extract instruction by an available IEU,
      a sixth computer readable code for setting an indication that the result of said extract instruction needs to be written into a result field of the first instruction following the extract instruction, and
      a seventh computer readable code for writing the extract instruction result into the result field of said first instruction, and into all fields of operands being dependent of said first instruction.

9. A computer system having an out-of-order processing system for operating a processor having an architecture of a larger bit-length with a program comprising instructions compiled to produce instruction results of at least one smaller bit-length, said computer system executes a readable machine language, said readable machine language comprises:
   a first computer readable code for detecting when in program order a first instruction is to be dispatched which does not have a target register address as one of its sources, wherein the first instruction is one of the instructions compiled to produce instruction results of at least one smaller bit-length;
   a second computer readable code for adding an extract instruction into an instruction stream before the first instruction, said extract instruction comprising additional computer readable code, said additional computer readable code comprises:
      a third computer readable code for dispatching the extract instruction together with the following first instruction from the instruction queue into a Reservation Station,
      a fourth computer readable code for issuing the extract instruction to an Instruction Execution Unit (IEU) as soon as all source operand data is available and an IEU is available according to respective issue scheme,
      a fifth computer readable code for executing the extract instruction by an available IEU,
      a sixth computer readable code for setting an indication that the result of said extract instruction needs to be written into a result field of the first instruction following the extract instruction, and
   a seventh computer readable code for writing the extract instruction result into the result field of said first instruction, and into all fields of operands being dependent of said first instruction.

10. A processing system having an out-of-order processing system for operating a processor having an architecture of a larger bit-length with a program comprising instructions compiled to produce instruction results of at least one smaller bit-length, said processing system having means for executing a readable machine language, said readable machine language comprises:

a first computer readable code for detecting when in program order a first instruction is to be dispatched which does not have a target register address as one of its sources, wherein the first instruction is one of the instructions compiled to produce instruction results of at least one smaller bit-length;

a second computer readable code for adding an extract instruction into an instruction stream before the first instruction, said extract instruction comprising additional computer readable code, said additional computer readable code comprises:

a third computer readable code for dispatching the extract instruction together with the following first instruction from the instruction queue into a Reservation Station, a fourth computer readable code for issuing the extract instruction to an Instruction Execution Unit (IEU) as soon as all source operand data is available and an IEU is available according to respective issue scheme, a fifth computer readable code for executing the extract instruction by an available IEU, a sixth computer readable code for setting an indication that the result of said extract instruction needs to be written into a result field of the first instruction following the extract instruction, and a seventh computer readable code for writing the extract instruction result into the result field of said first instruction, and into all fields of operands being dependent of said first instruction.

* * * * *